(12) United States Patent
Navarra Pruna

(10) Patent No.: US 11,161,289 B2
(45) Date of Patent: Nov. 2, 2021

(54) DEVICE AND METHOD FOR THE SUCTION OF AIR IN INJECTION MOLDS AND THE SUBSEQUENT EXPULSION OF MOLDED PIECES

(71) Applicant: COMERCIAL DE UTILES Y MOLDES, S.A., Sant Just Desvern (ES)

(72) Inventor: Alberto Navarra Pruna, Sant Just Desvern (ES)

(73) Assignee: COMERCIAL DE UTILES Y MOLDES, S.A., Sant Just Desvern (ES)

( * ) Notice: Subject to any disclaimer, the term of this patent is extended or adjusted under 35 U.S.C. 154(b) by 269 days.

(21) Appl. No.: 15/661,716

(22) Filed: Jul. 27, 2017

(65) Prior Publication Data
US 2018/0029271 A1 Feb. 1, 2018

(30) Foreign Application Priority Data

Jul. 27, 2016 (ES) ................ ES201631030

(51) Int. Cl.
| | | |
|---|---|---|
| *B29C 45/40* | (2006.01) | |
| *B29C 45/43* | (2006.01) | |
| *B29C 45/17* | (2006.01) | |
| *B29C 45/34* | (2006.01) | |

(52) U.S. Cl.
CPC ...... *B29C 45/4005* (2013.01); *B29C 45/1701* (2013.01); *B29C 45/1753* (2013.01); *B29C 45/345* (2013.01); *B29C 45/43* (2013.01)

(58) Field of Classification Search
None
See application file for complete search history.

(56) References Cited

U.S. PATENT DOCUMENTS

| | | |
|---|---|---|
| 6,367,765 B1 | 4/2002 | Wieder |
| 2002/0179613 A1 | 12/2002 | Matsui et al. |

FOREIGN PATENT DOCUMENTS

| | | |
|---|---|---|
| ES | 2348901 A1 | 12/2010 |
| JP | H01176530 A | 7/1989 |
| JP | H01210323 A | 8/1989 |
| JP | H02175115 A | 7/1990 |
| JP | H08-72109 A | 3/1996 |
| JP | H11105083 A | 4/1999 |

OTHER PUBLICATIONS

Extended European Search Report dated Nov. 29, 2017 for corresponding European Application No. 17382489.7.
Spanish Search Report dated Jan. 31, 2017 issued in the priority Application No. P 201631030.

*Primary Examiner* — Monica A Huson
(74) *Attorney, Agent, or Firm* — Lucas & Mercanti, LLP

(57) ABSTRACT

The device for the suction of air in injection molds and the subsequent expulsion of molded pieces has a Venturi ejector connected to a first valve, that when the mold is closed causes the suction of air in a mold cavity, having at least one insert made from porous material through which and by means of a communication duct that defines a suction circuit, and a second valve, that after the solidification of the plastic material, causes the air to be blown towards the at least one insert made of porous material, cleaning the at least one insert made of porous material. The volume of air to be reduced in the second part of the injection cycle with the same empirical value of 90% efficiency of the Venturi ejector.

5 Claims, 4 Drawing Sheets

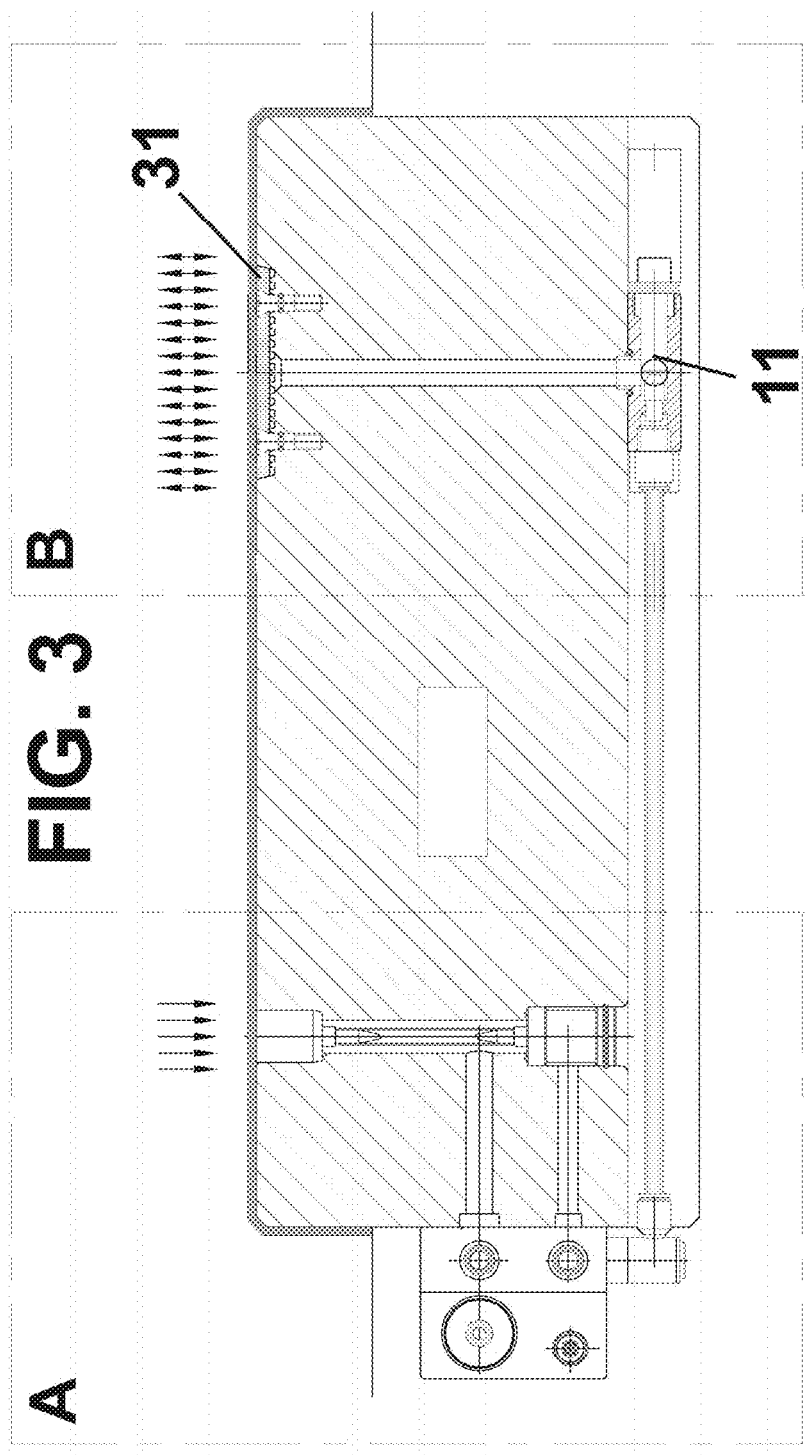

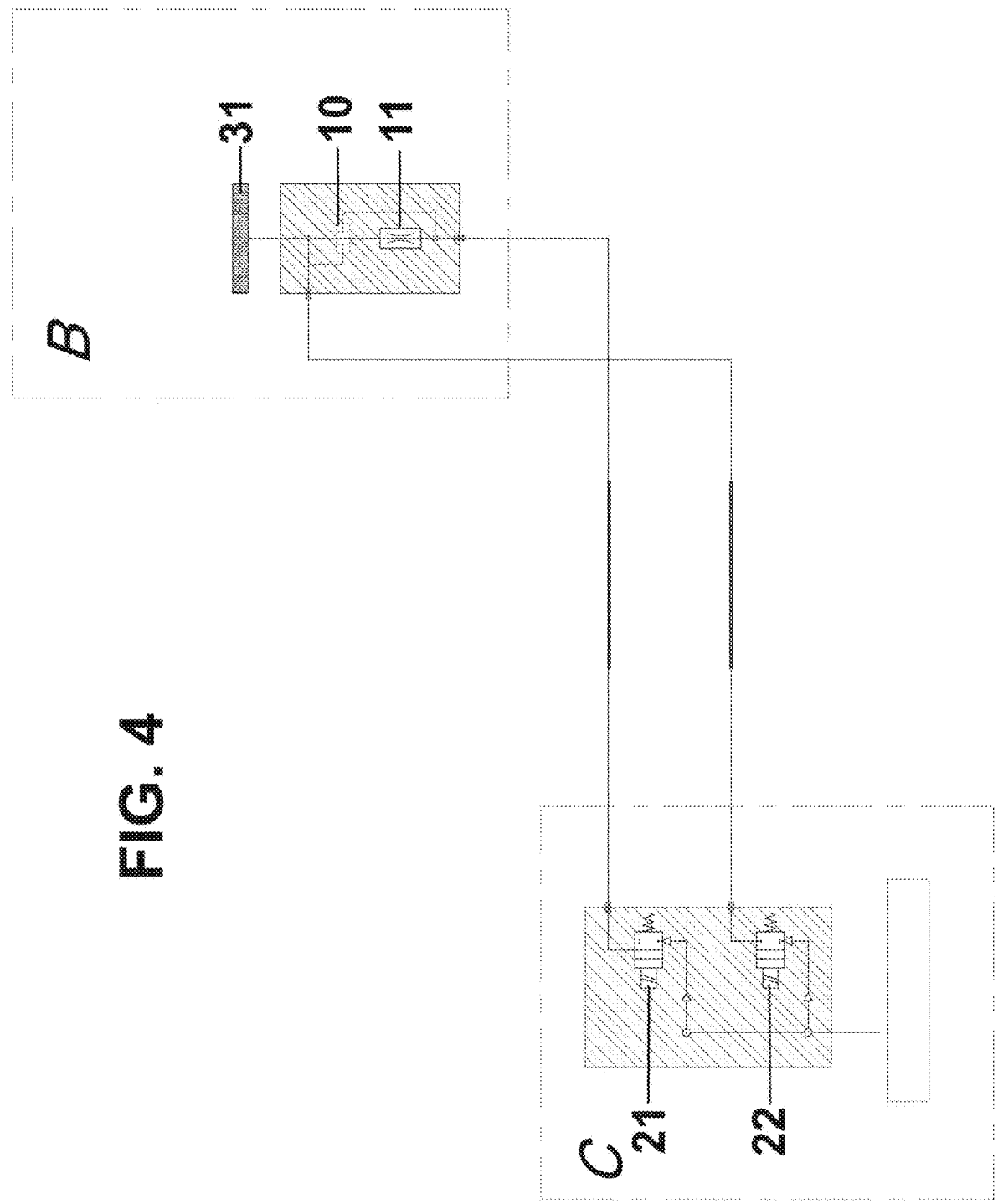

DEVICE AND METHOD FOR THE SUCTION OF AIR IN INJECTION MOLDS AND THE SUBSEQUENT EXPULSION OF MOLDED PIECES

CROSS-REFERENCE TO RELATED APPLICATION

This application claims the benefit of priority of Spanish Patent Application No. P 201631030 filed on Jul. 27, 2016, which is incorporated herein by reference

TECHNICAL FIELD

The present invention relates to a device and a method for the suction of air in injection molds and the subsequent expulsion of molded pieces.

BACKGROUND OF THE INVENTION

An injection mold can have one or several figure cavities, and during the injection process the plastic material, duly melted, is introduced using pressure, through a mouth or injection point, in each of the mold cavities, which means that the complete filling of each cavity is achieved.

The mold incorporates duly designed refrigeration circuits in order to cool the molten mass and be able to demold the pieces from the mold in a solid state.

During the injection process, the molten plastic material starts to apply pressure on the air that is enclosed in the mold cavity, compressing it and compelling it to forcibly exit, through the ejectors and small mechanisms made for this purpose, as well as the areas with inserts that each cavity can have.

This entire process requires an increase in temperature of the plastic mass and a higher injection pressure, in order for the mold cavity to be completely filled, mainly in areas with difficult configuration and therefore a longer cooling time for the plastic material before the duly solidified piece is able to be demolded.

In many cases, due to the excess temperature and pressure that is applied to the plastic material in order to fill the cavity, internal stresses in the piece are produced, which means that the dimensional stability is impacted, negatively affecting the final quality of the product.

Some solutions are known that enable the outlet of air from the contents of the mold cavity, preventing, however, the outlet of the injected plastic material, since they are porous materials or inserts with several pieces that enable microporosity. The main inconvenience of these systems is that they are very easily clogged and require continuous maintenance, which hinders production and makes it expensive.

These processes can affect the quality of the obtained piece, since there can be air bubbles left trapped in the molded pieces, which may create connection lines in certain configurations, which may affect the dimensional stability and the mechanical resistance, as well as cause discoloration due to inadequate temperatures during the injection process. Inadequate extraction of the air can also cause gases to be trapped during the injection process and cause creases in the visible faces of the pieces injected in these circumstances as well as the injected material, which is subjected to stresses that can cause imperfections and deformations in the obtained pieces.

For the ejection of the piece from the cavity, duly distributed expellers are normally used that enable the extraction of the piece, once it is solidified.

In document ES2348901A1, from the same owner of the present application, a system is described that eliminates the air from the cavity of a mold before proceeding to the injection of the thermoplastic, in order to achieve an optimal piece quality.

With this system, notable improvements are made, but a perfect injection has not yet been achieved, since the suction that is maintained through the special expellers does not provide the sufficient vacuum level. Furthermore, it has been observed that, if the mold is not completely sealed, during the brief time that the injection signal has been given until the plastic actually enters the cavity, the atmospheric pressure tries to balance the pressures on the inside of the mold and part of the efficiency of the vacuum obtained is lost.

In this system up to 90% of the air in the cavity is eliminated, even though the mold is completely sealed, and we keep suctioning the air through the expellers in order to maintain the vacuum level, as the material starts to enter, the same plastic that starts to fill the cavity starts to clog the areas where the expellers are located, thereby slowly reducing the efficiency of maintaining the suction through them. The result is that we do not achieve a vacuum in the cavity as would be expected.

The object of the present invention is to reduce the volume of air in this second part of the injection cycle with the same empirical value of the Venturi system.

To do so, we will use a second Venturi unit in the mold, but with certain characteristics in order to obtain optimal results.

This second Venturi unit, instead of actuating through a valve and a pneumatic piston, will do so through a porous insert placed in the mold cavity, but it will actuate with an identical sequence. In other words, from the moment that the valve of the current system closes, the new system will continue to suction solely through the porous insert and during the entire injection cycle. In all cases, this porous insert will need to be housed in the end of the path of the plastic mass, since it is where the material will be the coldest, and therefore less fluid, all with the purpose of not clogging the micro-pores of the porous material with the injected material. This device incorporates a flow distributor that, through a double-acting piston, will open or close the Venturi duct or the duct for pressured air for cleaning the porous material.

Thus, the new system is a device that should be independently coupled in the mold, but that, by means of flexible tubes connected to the current system, will receive therethrough the supply for the Venturi, and the supply for cleaning, and since the suction of the mold cavity will be carried out by means of the double-acting piston, by means of the porous material, or will blow air through the same duct over the porous material. At the same time as the mold is closed, the same air that enters to activate the Venturi passage actuates the double-acting piston, such that the only viable duct is that of the suction of the air from the cavity through the porous material, while, when the air for cleaning enters the system, this same air actuates double-acting piston in the opposite direction, thereby closing the Venturi passage and concentrating all of its pressure on the porous insert, in order to clean it.

DESCRIPTION OF THE INVENTION

The device and method of the invention solve the drawbacks mentioned and provide other advantages which are described below.

According to a first aspect, the present invention relates to a device for the suction of the air in injection molds and the subsequent expulsion of the molded pieces according to claim 1.

The device for the suction of the air in injection molds according to document ES2348901A1 comprises a Venturi ejector connected to the mold cavity, and that through a valve activated by a pneumatic piston, that upon being opened allows for a large suction flow (remember that we breathe air at atmospheric pressure, and therefore we refer to depression), once the desired vacuum level has been reached, the piston closes the valve, also closing the Venturi suction, but the suction can be continued through special ejectors designed for this purpose and during the entire injection cycle.

In the device according to the present invention the expellers are dispensed with, as well as all the ducts machined in the mold that should have been made in order to connect all the locations of the same to a circuit connected to the main suction duct. With the device according to the present invention, instead of expellers, we will install in the mold an insert made of porous material, through which we will carry out the entire suction process with the second Venturi.

The porous material is preferably made of bronze or stainless steel, since many plastic materials can incorporate corrosive components.

The suction is performed until the programmed vacuum value is reached, which is when the valve closes, while from this point on only the second Venturi is suctioning the air from the cavity, through the porous insert, when the plastic material starts to enter the cavity, the volume of air to be suctioned reduces proportionally, which is eliminated by both the power of the Venturi suction and its own injection pressure, since the plastic material itself acts as a piston compressing the remaining air and increasing its outlet pressure, which means that the efficiency of the system is considerably improved.

With this system and according to the present invention, the volume of air is reduced in the second part of the injection cycle with the same empirical value of the 90% efficiency of the Venturi ejector, since the porous area is located precisely in the last section of the injection path, which is precisely where the plastic is less fluid when it arrives and, therefore, it is more difficult for the same to clog the micro-pores of the porous material.

Due to the porous material, the reduction of the volume of the mold cavity to be filled is reduced while the suction percentage is continuously held at 90%, for which reason the real percentage of aspirated air is much higher than that of the preceding model, since at no point is the aspiration micro-porosity clogged.

According to a second aspect, the present invention also relates to a method for the suction of air in injection molds and the subsequent expulsion of molded pieces according to claim 6.

Optional characteristics of the device and the method according to the present invention are described in the dependent claims.

BRIEF DESCRIPTION OF THE DRAWINGS

For the purpose of helping to make the foregoing description more readily understandable, it is accompanied by a set of drawings which, schematically and by way of illustration and not limitation, represent an embodiment.

FIG. 3 is a schematic view of a mold that the device of the present invention incorporates, according to said first embodiment; and FIG. 4 is a diagram of the connections of the device of the present invention according to a second embodiment; wherein the diagram of the system already installed in the machine is indicated, where box B shows the differences incorporated in the present invention, and box C shows the valves of the machine.

DESCRIPTION OF PREFERRED EMBODIMENTS

The device according to the present invention preferably comprises two mechanisms installed in the same mold. However, it should be noted that both mechanisms can also work separately, although with different benefits than those described below.

The combined installation is principally intended for large molds, or for molds that, due to their characteristics, require a high technology concept, while separately they can be used for small molds with multiple cavities or for pieces in which the quality of the final product does not need high technical resolution parameters.

In order to describe the complete device such that it is easily comprehensible we refer to the electro-pneumatic mechanism, the same as that in document ES2348901A1, (indicated as A in FIG. 2), while the pneumatic mechanism (indicated as B in the same figure) is the object of the present application.

Figure 1A:
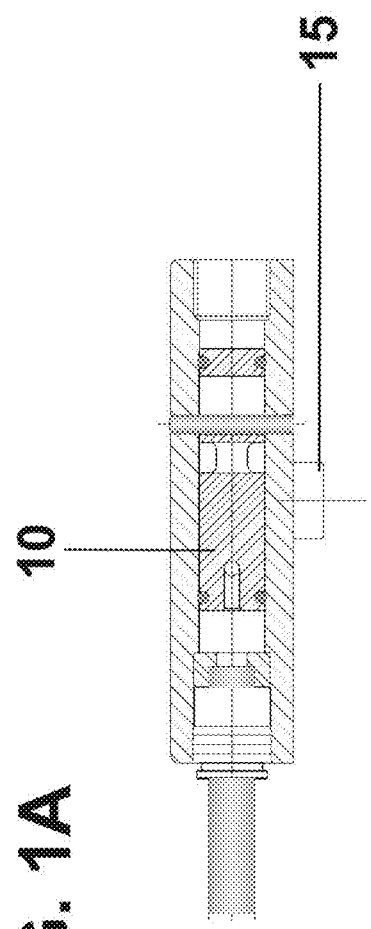
FIGS. 1A and 1B show the double-acting piston and the Venturi ejector of the device according to the present invention, respectively.
Figure 1B:
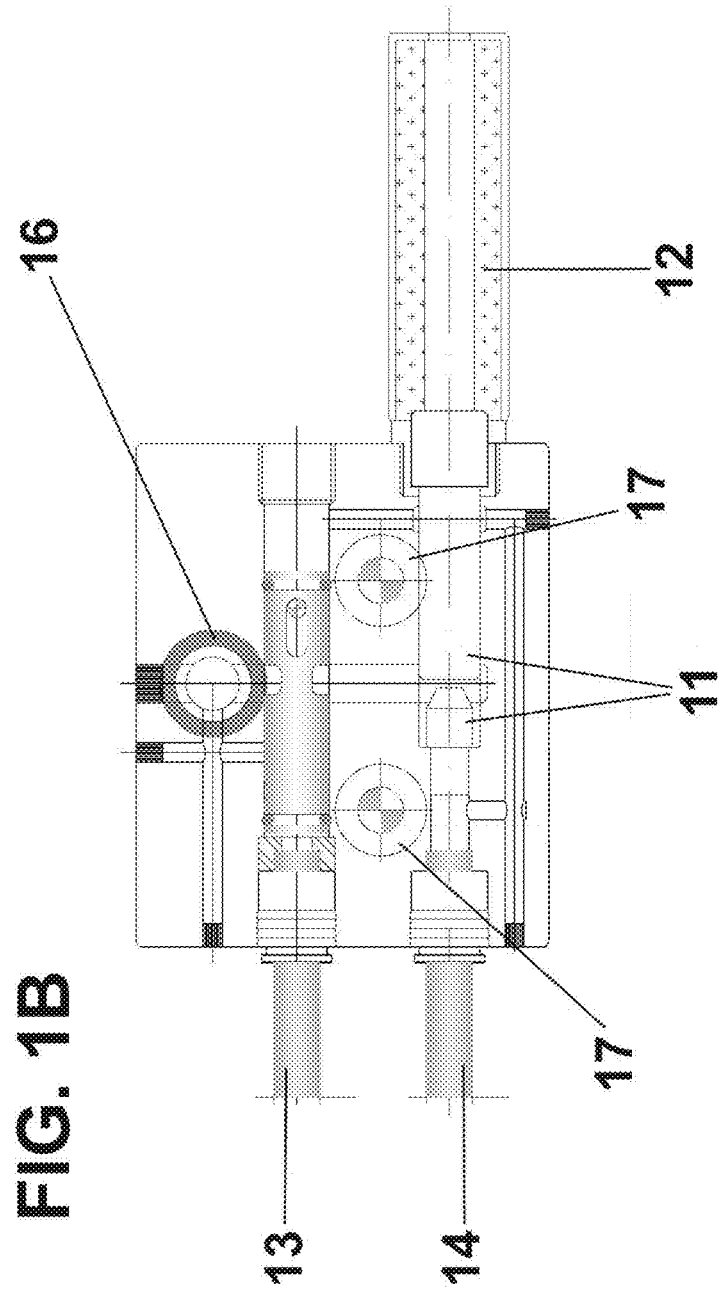

The pneumatic mechanism B is basically made up of a body preferably made of aluminum, wherein a Venturi ejector 11 is housed, a double-acting piston 10, a silencer 12 and two connections for connecting the compressed air inlets, cleaning air inlet 13 and air inlet 14 from the Venturi ejector. Furthermore, it comprises a connecting nozzle 15 to be coupled in the mold through an O-ring 16, and a pair of screws 17 for its fastening, all of this shown in FIG. 1, wherein the device is shown schematically, wherein it shows the location of the Venturi ejector 11, the double-acting piston 10, the silencer 12, the connecting nozzle 15 for connecting to the mold, the O-ring 16, the air inlets 13, 14 and the position of the fastening screws 17 for fastening to the mold.

Figure 2:
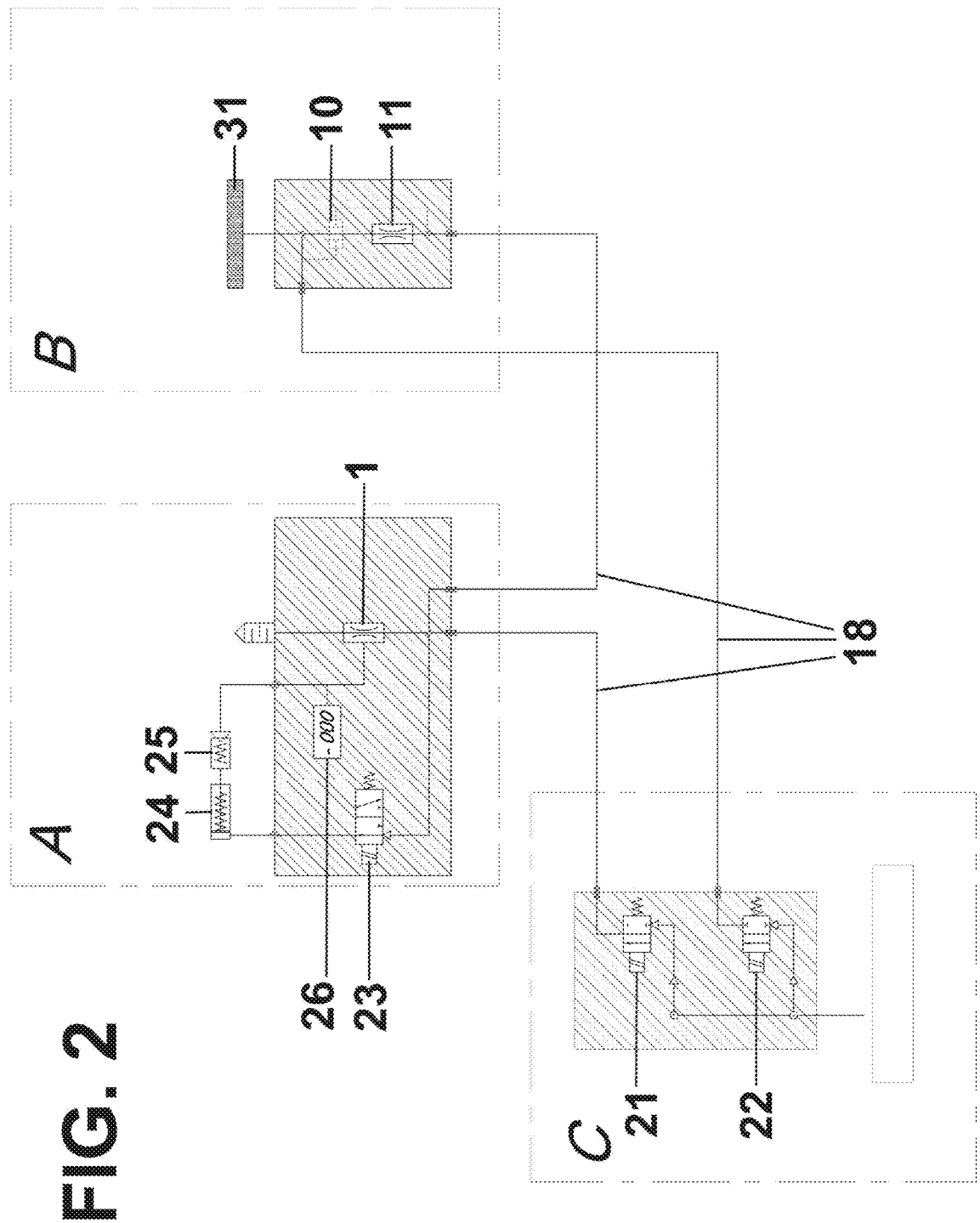
FIG. 2 is a diagram of the connections of the device of the present invention according to a first embodiment; wherein the complete diagram of the system already installed in the machine is indicated, where the box A represents the mechanism according to the document ES2348901A1, box B shows the differences incorporated in the present invention, and box C shows the valves of the machine.

FIG. 2 shows that the mechanism A, which is the same as that described in document ES2348901A1, comprises the following elements: a Venturi ejector 1, an internal valve 23, a piston 24, a flow valve 25 and a vacuum gauge 26, the function of which will be described later.

FIG. 2 also shows how the mechanisms A, B stay interconnected in the mold by means of flexible tubes 18 for rapid connection, one connection tube is for supplying the Venturi ejectors 1, 11 that comes from a first valve 21, while the other tube, which comes from a second valve 22, is only intended for the cleaning function of the porous material, the first and second valves 21, 22 being part of the equipment of the mold machine itself.

The method according to the present invention is the following, according to a first embodiment. Upon closing the mold, the first valve 21 that connects the entire internal circuit of the electro-pneumatic mechanism A is actuated. This air flow, upon entering into this mechanism A, is divided into three ducts, a first duct connected to the internal valve 23, through which the piston 24 is activated, which opens the mold aspiration flow valve 25, the second duct connected to the Venturi ejector 1, and the third duct interconnected to the Venturi ejector 11 through the tubes. When the vacuum flow reaches the programmed value, the vacuum gauge 26 activates the internal valve 23 of the mechanism, closing the passage of the mold valve 25 and, therefore, also closing the suction of the Venturi ejector 1. From this point on, we continue suctioning only with the Venturi ejector 11 through a porous insert 31 arranged in the pneumatic mechanism B until the end of the injection cycle. Upon arriving at this point, the first valve 21 is closed, the entire internal circuit of the system thus staying closed.

It is at this point when the expulsion of the mold is activated that the second valve 22 comes into operation, which activates the double-acting piston 10 of the mechanism B, closing the passage in the direction of the Venturi ejector 11, concentrating all its pressure only for cleaning the porous material 31. The blowing-cleaning time can be programmed as necessary.

As shown in FIG. 3, with the aim of taking complete advantage of the entire suction surface of the porous material of the insert 31, it is provided that it already contains a smooth face and a face with small protrusions in its design, in order to, upon being mounted in the punch of the mold, keep some areas of free air circulation, for when suction is performed through the Venturi ejector 1, as well as for when it is time for it to be cleaned. These small protrusions act like a "bed of nails", in other words they have enough of a contact surface for its fastening, as well as enough of an aerating surface for its perfect functionality.

FIG. 4 shows a second embodiment of the device according to the present invention, in which the electro-pneumatic mechanism A is not present. This embodiment is for a mold with several small cavities, wherein due to the geometry of the product, it does not have areas or enough space to apply the vacuum valve, and only the pneumatic mechanism B can be applied, since, by being a reduced air volume, the direct suction of the Venturi ejector 11 enables the air in these small cavities to be emptied through the porous material of the insert 31.

The operation of the device according to the present invention only with the pneumatic mechanism B is schematically described in FIG. 4. For the sake of simplicity, the same reference numbers are used to identify the same or similar components as in the embodiment in which the electro-pneumatic mechanism B and the machine valves are used. It should be noted that, even though only one insert 31 is shown in FIG. 4, preferably more than one insert 31 will be used, as could be embodied in the first previous embodiment.

The method according to the present invention is the following, according to said second embodiment:

Upon closing the machine, the first valve 21 that gives air to the Venturi ejector 11 is actuated, starting the suction of the air through a circuit that connects to all the cavities. Next, the injection is performed.

From this point on and during the entire injection time, the Venturi ejector 11 continues to apply suction though the inserts made of porous material 31. Upon ending the injection cycle, the first valve 21 that gives air to the Venturi ejector 11 is closed. When the expulsion from the mold is activated, the second valve 22 enters into operation, which makes the double-acting piston 10 actuate, closing the passage in the direction of the Venturi ejector 11, concentrating all its pressure only on cleaning the porous material. The blowing-cleaning time can be programmed as needed.

Despite the fact that reference has been made to a specific embodiment of the invention, it is evident for a person skilled in the art that numerous variations and changes may be made to the device and method described, and that all the aforementioned details may be substituted by other technically equivalent ones, without detracting from the scope of protection defined by the attached claims.

The invention claimed is:

1. A device for the suction of air in injection molds and the subsequent expulsion of molded pieces, comprising
   a Venturi ejector,
   a first valve connected to the Venturi ejector configured to suction air in a mold cavity when the mold is closed thereby initiating an injection cycle,
   a pneumatic double-effect piston in fluid communication with the Venturi ejector and configured to close passage of air in a direction of the Venturi ejector when the first valve is closed;
   at least one insert made from porous material through which and by means of a communication duct defines a suction circuit, said at least one insert is in fluid communication with the pneumatic double-effect piston; and
   a second valve in fluid communication with the pneumatic double-effect piston, actuating the pneumatic double-effect piston to blow air towards the at least one insert after the solidification of the plastic material, thereby cleaning said at least one insert made of porous material,
   wherein upon ending the injection cycle, the first valve that causes the suction of air closes, and
   wherein upon expulsion of the mold, the second valve enters into operation by making the double-effect piston actuate, closing a passage in a direction of the Venturi ejector, concentrating a pressure only on cleaning the porous material.

2. The device according to claim 1, wherein said at least one insert made of porous material is made of bronze or stainless steel.

3. The device according to claim 1, wherein said at least one insert made of porous material comprises a smooth face and a face provided with a plurality of protrusions.

4. A method for the suction of air in injection molds and the subsequent expulsion of molded pieces using the device of claim 1, the method comprising:
   actuating the first valve in order to cause the suction of air though the at least one insert made of porous material and the Venturi ejector;
   injecting plastic material maintaining the suction of air open, during the entire injection cycle;
   closing the passage of air from the Venturi ejector at the end of the injection, by means of the first valve;
   allowing the plastic material to cool after the injection until its solidification;
   activating, at the time of the expulsion of the injected piece, the second valve for blowing air for cleaning the at least one insert made of porous material,
wherein upon ending the injection cycle, the first valve that causes the suction of air closes, and
wherein upon expulsion of the mold, the second valve enters into operation by making a double-effect piston actuate, closing a passage in a direction of the Venturi ejector, concentrating a pressure only on cleaning the porous material.

5. The method according to claim 4, wherein the suction is performed until a 90% vacuum is reached.

* * * * *